United States Patent
Obst (12) 
(10) Patent No.: US 6,354,442 B1
(45) Date of Patent: Mar. 12, 2002

(54) FILTER WITH COUNTER FLOW CLEARING

(75) Inventor: Yuri Obst, The Levels (AU)

(73) Assignee: University of South Australia, Adelaide (AU)

(*) Notice: Subject to any disclaimer, the term of this patent is extended or adjusted under 35 U.S.C. 154(b) by 0 days.

(21) Appl. No.: 09/319,152

(22) PCT Filed: Dec. 1, 1997

(86) PCT No.: PCT/AU97/00807

§ 371 Date: May 28, 1999

§ 102(e) Date: May 28, 1999

(87) PCT Pub. No.: WO98/23357

PCT Pub. Date: Jun. 4, 1998

(30) Foreign Application Priority Data

Dec. 1, 1997 (AU) .............................................. PO3897

(51) Int. Cl.⁷ .............................................. B01D 35/24
(52) U.S. Cl. ...................... 210/353; 210/391; 210/393; 210/408
(58) Field of Search ................. 210/353, 391, 210/393, 408

(56) References Cited

U.S. PATENT DOCUMENTS

| 4,859,335 A | 8/1989 | Whyte |
| 5,006,136 A | 4/1991 | Wetter |
| 5,152,981 A | 10/1992 | Netkowicz et al. |
| 5,490,924 A | 2/1996 | Macia et al. |

FOREIGN PATENT DOCUMENTS

| GB | 2 157 964 | 11/1985 |
| WO | WO 96/36416 | 11/1996 |
| WO | WO-98/23357 | * 6/1998 |

* cited by examiner

*Primary Examiner*—Chester T. Barry
(74) *Attorney, Agent, or Firm*—Brown, Martin, Haller & McClain, LLP (57) ABSTRACT

A filter system (10) comprising a filter medium (11) for filtering contaminants from a process fluid, having a filtration side on which contaminants collect and a filtrate side from which filtrate flows; a counter-flow generator (20) located on the filtrate side that directs a localized stream of counter-flow fluid (23) from the filtrate side to the filtration side of the filter medium (11) to thereby dislodge the contaminants from the filtration side of the filter medium (11), wherein the localized stream (23) traverses a substantial proportion of the filter medium (11). The filter system (10) optionally further comprises a clearing-flow generator (30) or like means located on the filtration side of the filter medium (11) which clears contaminants from the filter medium (11).

32 Claims, 4 Drawing Sheets

FILTER WITH COUNTER FLOW CLEARING

This invention relates to an improved form of filter, and in particular to a filter having a novel means of clearing contaminants from the upstream or filtration side of the filter to thereby increase filtering efficiency.

BACKGROUND

The present invention will have many varied and diverse applications. The scope of the invention will include the filtering of solids from liquids, the filtering of solids entrained in air, the filtering of immiscible liquids from process liquids, and the filtering of droplets from air.

The filtration of contaminants from fluids occurs in many applications including: industrial, agricultural, medical, food, fibre, effluent treatment, by-product recovery and fluid recycling. For example, in a washing or cleaning process, solids are present in the used fluid and provided that those solids can be removed, the fluid can then be repeatedly reused in the process until requiring eventual disposal.

There are many known conventional filtering techniques, many of which are referred to as "dead-end" filtration. In these conventional "dead-end" filtration processes, as fluid passes through the filter medium, suspended contaminants larger than the pore or aperture size of the filter medium are collected on the upstream side of the filter medium as process fluid passes through the filter medium. As the amount of contaminant accumulates on the upstream side of the filter medium, the resistance to flow through the filter increases, the flow of fluid passing through the filter medium decreases and the differential pressure across the filter medium increases. This continues until a situation is reached where the accumulation of contaminants on the upstream side of the filter medium has to be removed to enable the filtration process to continue. This "dead-end" point in conventional filtration systems is the reason why some form of cleaning is required. Typical cleaning processes include: periodic back flushing where the direction of fluid flow through the filter medium is reversed; and mechanical scraping where a scraper traverses the surface of the filter medium to remove contaminants thereby exposing the filter medium to damage. These cleaning processes interrupt the filtering process and therefore introduce further inefficiencies. Furthermore, in some applications it is impractical to clean the filter medium frequently enough to prevent build up of contaminant on the filter medium surface using those cleaning processes and therefore poor filtration efficiencies result.

While there exist numerous types of self-cleaning filters their limitations include: the types of fluids that they are able to filter, their durability, the flow rates achievable and the operational time of the filtration process before shutdown maintenance is required.

It is an object of this invention to overcome the above-mentioned problems and to produce a filtration system which more readily and continually clears accumulating contaminants from a filter medium during a filtering process.

SUMMARY OF THE INVENTION

In its broadest form, the invention is a filter system comprising:

a filter medium, for filtering contaminants from a process fluid, having a filtration side on which said contaminants collect and a filtrate side from which filtrate flows;

a counter-flow generator located on said filtrate side that directs a localised stream of counter-flow fluid from said filtrate side to said filtration side of said filter medium to thereby dislodge said contaminants from said filtration side of said filter medium, wherein said localised stream traverses a substantial proportion of said filter medium.

Causing the contaminants that accumulate on the filtration side to dislodge has several advantages. There is a breaking up of any caking that occurs on the filtration side, and the contaminants are dispersed into the process fluid thereby greatly reducing their concentration in the immediate vicinity of the filter medium when the flow again returns through the area of the filter medium from which contaminants have been dislodged. This has the effect of keeping the pressure differential across the filter medium low. Advantages arising from this form of continuous maintenance of filter medium include: elimination of mechanical damage to the filter medium, reduced filter area requirement, limited pressure build-up across the filter media and, importantly, reduced forces on the filter medium itself. Reduced forces on the filter medium allow additional versatility in the selection of filter media and reduce the need for structural supports for these filter media. A unitary filter medium only supported at its edges may be used, wherein the filter is unitary in the sense that it is uniform in porosity and is homogenous.

Any suitable filter medium may be used. The filter medium may be rigid or flexible and may be made from a range of woven or unwoven porous type materials such as fibrous cloth or sheet, steel or polymeric open mesh type material. Filter media with relatively large pore sizes such as screens or sieves may also be used.

Preferably the entire filter medium less only the area through which the localised stream of counter-flow flows, is continuously available for filtering contaminants. This produces a more efficient and more compact filtration system.

Preferably the filtration system further comprises a clearing-flow generator located on the filtration side that directs a localised stream of clearing-flow with a velocity component having a direction across an area on the filter medium adjacent the area at which the localised stream of counter-flow flows through the filter medium. Furthermore, preferably the localised clearing-flow stream moves in unison with the localised counter-flow stream during at least a portion of said counter-flow stream's traverse.

The operation of the counter-flow generator (with or without the clearing-flow generator) may be either periodic or continuous.

In a first preferred arrangement the filter system has a filter medium that is substantially planar and is inclined to the horizontal. In this arrangement the process fluid flows downwards from the upper end of the top side of the inclined filter medium and the counter-flow generator comprises at least one fluid outlet orientated to direct counter-flow fluid towards the filter medium across the width of the filter medium and movable in a direction substantially parallel to the filtrate side of the filter medium to continuously traverse a substantial proportion of the filter medium. Underneath the filter medium there may be provided a filtrate collection tray. Preferably a clearing-flow generator as described above is also provided.

This first preferred arrangement is particularly suitable for continuous filtration of process liquids with a high proportion of contaminant.

In a second preferred arrangement the filter medium is substantially cylindrical in shape and the counter-flow generator further comprises a manifold with a plurality of fluid outlets, the manifold being rotatable about an axis within the substantially cylindrical filter medium to thereby provide a means for traversing the filter medium. Preferably a clearing-flow generator as described above is also provided.

In another aspect of this invention applicable to this second preferred arrangement the filter medium is divided into a grid of elements the centres of which bow towards the direction of flow of the filtrate upon sufficient pressure differential across the filter medium and, when exposed to the localised counter-flow stream, invert to bow in the direction of the counter-flow fluid to thereby assist in the dislodgment of the contaminants from the filter medium.

The above described second preferred arrangement works particularly well when the filter system is located within a volume of process fluid which requires filtration. This can be achieved by immersing the filter medium in a vessel containing the process fluid. The vessel may be a settling tank or pond for instance.

In a third preferred arrangement the filter system according to the second preferred arrangement is enclosed by a substantially cylindrical vessel having a process fluid inlet orientated so as to provide the process fluid with a velocity having a component tangential to the substantially cylindrical filter medium.

Preferably the "process fluid" inlet is located at the upper end of the enclosing cylindrical vessel and preferably there is a contaminant discharge point at the lower end of the enclosing cylindrical vessel. With this arrangement contaminants are subject to centrifugal forces which assist to move them radially away from the filter medium.

The counter-flow generator, as previously described for each of the three preferred arrangements, preferably comprises a focused spray jet or a series of focused spray jets which direct a high velocity counter-flow stream towards the filter medium.

Filtration systems according to the invention are able to operate without or with process control systems.

The term "process fluid" is used throughout this specification and its claims to denote fluid to be filtered. It can be fluid from any source and is not restricted to fluid from any specific source or group of sources.

The word "contaminant" is used throughout this specification and its claims to denote the component of the process fluid that is to be filtered from the process fluid. In some applications the contaminant may be a valuable by-product that can be used after filtration.

In order to fully understand the invention, preferred embodiments will now be described, but it will be realised that the invention is not to be confined or restricted to the precise nature of these embodiments.

DETAILED DESCRIPTION OF THE EMBODIMENTS OF THE INVENTION

Embodiments are illustrated diagrammatically in the accompanying drawings.

In a first embodiment of the invention shown in FIGS. 1, 2, 3a and 3b the filter system 10 comprises: planar filter medium 11 disposed below weir 13 over which process fluid flows from process fluid tank 12; filtrate collection tray 14; counter-flow generator 20; and contaminant collection tray 15. Process fluid enters the process fluid tank 12 via process fluid inlet 16. Other suitable flow distribution devices may be used instead of weir 13.

The counter-flow generator 20 comprises a conduit 22 in the form of a pipe with a plurality of fluid outlets 21 which direct a continuous stream of counter-flow fluid across the width of the filter medium towards the filtrate side of the filter medium 11. Filtrate leaves the filter system via filtrate fluid outlet 17.

While various fluid outlets 21 may be used, including nozzles of various designs, focused spray jets have been found to be particularly effective. FIGS. 1, 2, 3a and 3b show fluid outlets 21 in the form of focused spray jets arranged side by side such that the resultant counter-flow streams 23 overlap forming a linearly extended counterflow stream across the width of the filter medium 11.

The counter-flow generator 20 sweeps along the length of the filter medium 11 with a linear speed that is related to the process flow rate, filter length and contaminant content of the fluid to be filtered and the fluid type. In this way the dislodgment of contaminants from the filter medium is optimised to ensure that solids do not substantially accumulate on the filter medium 11. Optimally the upwards linear speed of counter-flow generator 20 is rapid relative to the downwards linear speed of counter-flow generator 20 and the downwards linear speed is set to maximise the fluidising and tumbling of solids down the filter medium 11 and into the contaminant collection tray 15.

The conduit 22 is connected to a pump means (not drawn) which provides sufficient pressure to the counter-flow fluid outlets 21 to produce a counter-flow stream sufficient to enable efficient dislodgment of contaminants from the filter medium 11. The counter-flow fluid outlets 21 are positioned and directed to provide a continuous localised stream of fluid across the width of the filter medium 11 through the filter medium 11 in a direction substantially normal to the surface of the filter medium 11 and opposite to the flow of filtrate through the filter medium (counter-flow). This localised counter-flow stream 23 continuously dislodges contaminants from the filtration side of the filter medium 11. Counter-flow fluid can either be make-up fluid or filtrate, but in either case preferably has a low flow rate in comparison to the total filtrate flow rate. The contaminants which are dislodged by counter-flow stream 23 are removed from the filter medium 11 by a combination of gravity and fluid flow.

Figure 1:
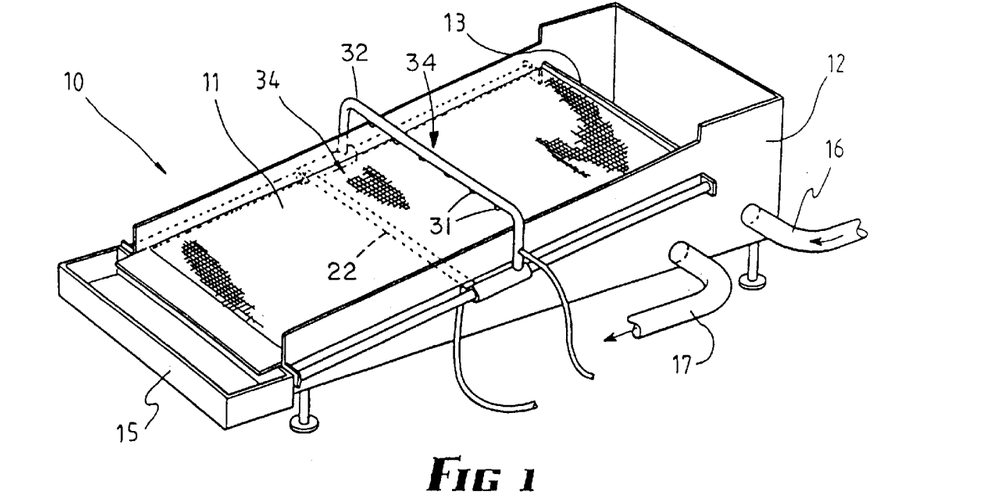
FIG. 1 shows in perspective view a first embodiment of a filter system according to the invention in which the filter medium is planar.
Figure 2:
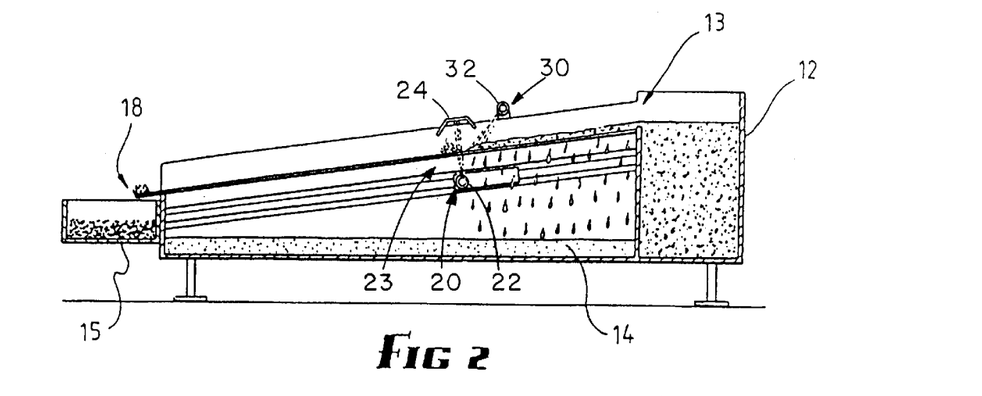
FIG. 2 shows the filter system of FIG. 1 in cross-sectional view.
Figure 3A:
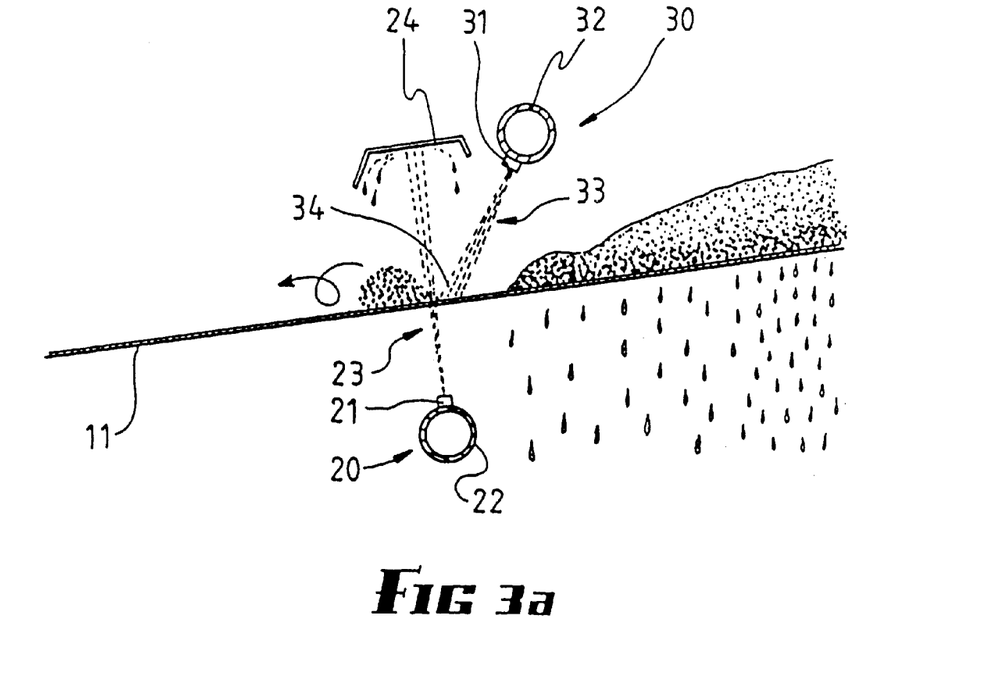
FIG. 3a shows a first portion of the filter system of FIG. 1 in a detailed cross-section view.
Figure 3B:
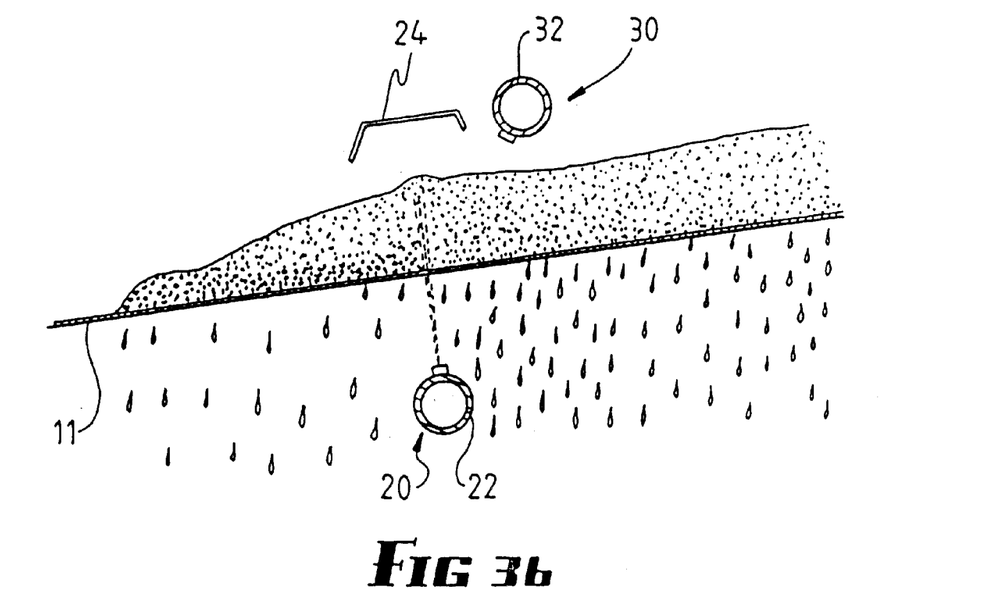
FIG. 3b shows a second portion of the filter system of FIG. 1 in a detailed cross-section view.

A spray shield 24 may be provided as shown in FIGS. 2 and 3 (left off FIG. 1 for clarity). This both contains counter-flow stream 23 and re-directs it back towards filter medium 11 to assist in clearing the contaminant 18.

Optional clearing-flow generator 30 is located on the filtration side of the filter medium 11 and directs a continuous localised clearing-flow stream 33 across the width of the filter medium 11 at an area on the surface of the filter medium 11 adjacent to the area through which the counter-flow stream 23 flows (shown in FIG. 3 as area 34). This action assists in the clearing of the contaminants 18 from the surface and adjacent the surface of the filter medium 11. Clearing-flow generator 30 comprises a plurality of clearing-flow fluid outlets 31 which are mounted on clearing-flow conduit 32. Clearing-flow generator 30 is preferably arranged to move in unison with counter-flow generator 20 during at least a portion of the counter-flow stream's traverse.

In operation the counter-flow generator preferably operates continuously for both its upward and downward stroke across the filter medium, however the clearing-flow generator 30 preferably only operates on the downward stroke to assist in the clearing of contaminants from the surface of filter medium 11 and into contaminant collection tray 15. In industries such as the food processing industry the contaminant may be reclaimed which can be collected by collection tray 15 or other means for value-added use.

FIG. 3b shows a first portion of the filter system of FIG. 1 in which the counter-flow stream enters the process fluid flow. FIG. 3a is a similar view further down the inclined filter medium 11 in which the counter-flow stream is outside of the main process fluid flow.

The incline angle of the filter medium 11 can be varied for optimal operation. Generally shallow inclines have been found to be appropriate for fine contaminants and steeper inclines have been found to be more appropriate for larger contaminants.

The optimum degree of incline is dependent upon: process fluid flow rate and intrinsic fluid properties; and the size and density of the contaminants. This first embodiment of the invention has been found to work particularly well in filtration of process fluids containing suspended contaminants as immediate separation of contaminant is achievable, in some applications obviating the need for a settling tank or pond.

Filter medium 11 shown in FIGS. 1, 2 & 3 is a woven stainless steel mesh; however any other suitable filter medium may be used including woven or unwoven porous type materials such as fibrous cloth or sheet or polymeric material.

The use of flexible filter media in combination with a high velocity counter-flow stream 23 has been found to provide a complimentary contaminant clearing effect due to a localised area of the filter medium being bulged outwards by the localised counter-flow stream 23.

Figure 4:
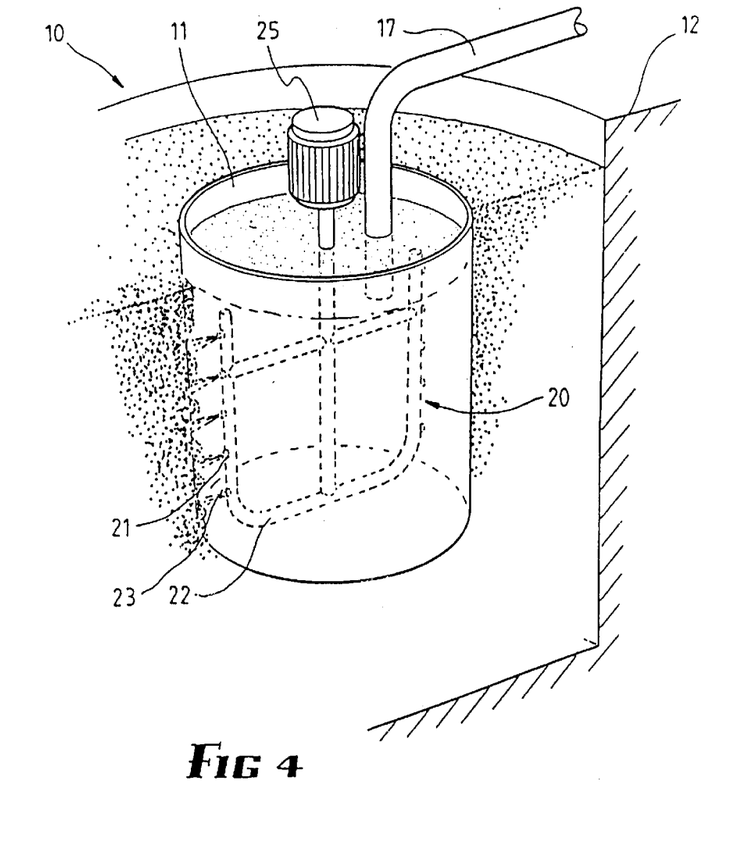
FIG. 4 shows a perspective view of a filter system according to a second embodiment of the invention in which the filter medium is cylindrical.
Figure 5:
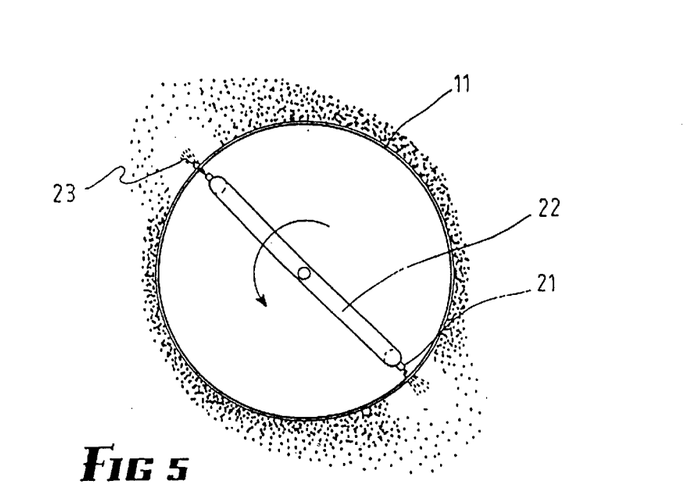
FIG. 5 shows a cross-sectional view of the filter system of FIG. 4.

FIGS. 4 and 5 show a second embodiment of the invention in which the filter medium 11 is cylindrical in shape. In this embodiment, counter-flow fluid outlets 21 are mounted on counter-flow conduit 22 as shown in FIG. 4 for ease of illustration and arranged to rotate about an axis which is substantially coaxial with the axis of the filter medium 11. Motor 25 rotates counter-flow conduit 22 within said filter medium 11 thereby causing the counter-flow stream 23 to continuously traverse the filter medium 11 thereby continuously dislodging contaminants from the filtration side of the filter medium 11. Filtrate is removed from within the cylindrical filter medium 11 by filtrate fluid outlet 17. Conduit 22 is connected to a pump means (not drawn) which provides sufficient pressure to the fluid outlets 21 to produce a counter-flow stream sufficient to enable efficient dislodgment of contaminant from the filter medium 11. In this way contaminant does not substantially accumulate on the filter medium 11. The filter system of this second embodiment is preferably mounted within a tank 12 which contains the process fluid. A clearing-flow generator may also be used.

Figure 6A:
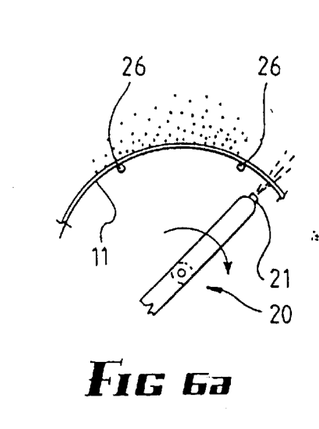
FIGS. 6a,b & c show a variant of a second embodiment of the invention in which the filter medium is divided into a grid of elements, the centres of which bow towards the direction of flow of the filtrate.
Figure 6B:
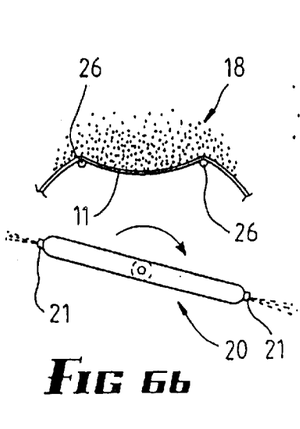
Figure 6C:
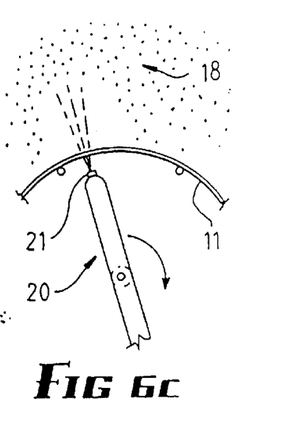

FIGS. 6a, b & c show a variant of the second embodiment of the invention in which the filter medium is divided up into a grid of elements, supported by battens 26, the centres of each filter medium element may bow in the direction of flow of the filtrate as contaminants accumulate. When accumulated contaminants cause a sufficient pressure differential across the filter medium, the fluid outlets 21 of the counter-flow generator return so as to traverse the filtrate side of the filter medium and the localised counter-flow stream causes the direction of curvature (or bowing) of the filter medium to reverse thereby assist in the dislodgment (fling) of contaminant material away from the filter element 11.

This second embodiment of the invention is ideally suited for immersion into a volume of fluid requiring filtration where the concentration of contaminants is relatively low. The aforementioned volume of fluid may for instance take the form of a settling tank or pond.

Figure 7:
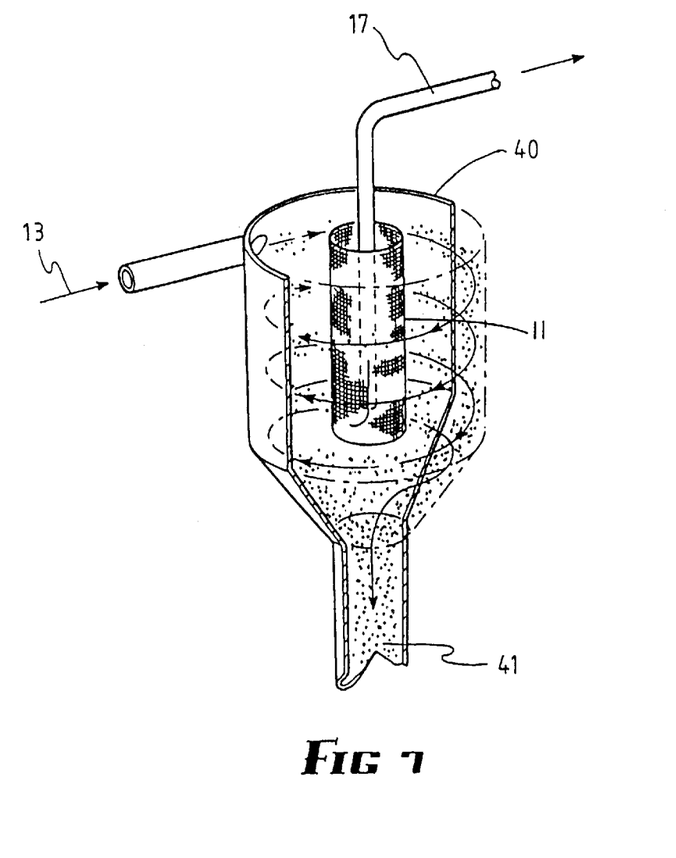
FIG. 7 shows a perspective view of a filter system according to a third embodiment of the invention.

FIG. 7 shows a third embodiment of the invention in which the filter system 10 of FIGS. 4 & 5 is located within a cylindrical vessel 40 having a process fluid inlet 13, a filtrate fluid outlet 17 and a contaminant outlet 41 through which contaminant is continually or periodically dumped. The longitudinal axis of the filter medium 11 and of the cylindrical vessel 40 is substantially vertical so as to maximise the settling of contaminants under the action of gravity. Process fluid inlet 13 is orientated such that process fluid enters cylindrical vessel 40 tangentially and flows in a circular motion around the filter medium 11. Particles or droplets entering the system which have a density higher than that of the suspending process fluid will separate due to the centrifugal effects generated by the rotating fluid. In this manner the more dense droplets or particles will move radially outwards. This effect lightens the contaminant loading on the filter medium 11 and therefore may negate the requirement for a separate clearing-flow generator. Where a separate clearing-flow generator is used (not shown in FIG. 7), the combined action of the aforementioned circular flow around filter medium 11 induced by the tangential inlet flow with the clearing-flow generator provides a highly effective arrangement for preventing the substantial accumulation of contaminants even with process fluids with relatively high contaminant loadings.

A plurality of the filtration systems according to the invention as described above can be used in series to selectively separate individual contaminants from a process flow.

In some applications a plurality of counter-flow generators for a single filtration system will be optimum. Similarly, in some applications a plurality of clearing-flow generators will be optimum for a single filtration system.

While the present invention has been described in terms of preferred embodiments in order to facilitate better understand of the invention, it should be appreciated that various modifications can be made without departing from the principles of the invention. Therefore, the invention should be understood to include all such modifications within its scope.

The claims defining the invention are as follows:

1. A filter comprising:
    a filter medium for filtering contaminants from a process fluid, having a filtration side on which said contaminants collect and a filtrate side from which filtrate flows;
    a counter-flow generator comprising at least one fluid outlet located on said filtrate side that directs a localized stream of counter-flow fluid from said filtrate side to said filtration side of said filter medium to thereby dislodge said contaminants which have collected on said filtration side of said filter medium;

a clearing-flow generator comprising at least one fluid outlet located on said filtration side that directs a localized stream of clearing-flow fluid, with a velocity having a component that is parallel to the surface of the filter medium, onto said filter medium; and the counter-flow generator and clearing-flow generator being movably mounted relative to said filter medium for movement of said counter-flow and clearing-flow fluid streams relative to and over a substantial portion of said filter medium.

2. A filter according to claim 1 wherein said counter-flow generator further comprises a manifold with a plurality of fluid outlets thereby producing an elongate counter-flow stream across said inclined filter medium which moves relative to and over a substantial portion of said inclined filter medium.

3. A filter according to claim 1 wherein said clearing-flow generator further comprises a manifold with a plurality of fluid outlets thereby producing an elongate clearing-flow stream.

4. A filter system according to claim 1, wherein the filter medium is a substantially planar, inclined member, and a flow distribution means is located adjacent said upper end of the top side of said inclined filter medium adapted to provide an even distribution of process fluid onto said filter medium.

5. A filter according to claim 4, wherein said flow distribution means comprises a weir located adjacent said upper end of the top side of said inclined filter medium adapted to provide an even distribution of process fluid onto said filter medium.

6. A filter according to claim 5 further comprising a contaminant discharge point at the lower end of said filter medium.

7. A filter according to claim 1 wherein said localized stream of clearing-flow fluid is directed onto an area adjacent to the area on said filter medium through which said localized stream of counter-flow fluid flows.

8. A filter according to claim 7 wherein said localized stream of counter-flow fluid and said localized stream of clearing-flow fluid move substantially in unison for at least a portion of their said movement.

9. A filter comprising:
a substantially planar inclined filter medium, for filtering contaminants from a process fluid wherein said process fluid flows downwards from the upper end of said inclined filter medium, having a filtration side on which said contaminants collect and a filtrate side from which filtrate flows;

a counter-flow generator comprising at least one fluid outlet located on said filtrate side that directs a localized stream of counter-flow fluid from said filtrate side to said filtration side of said filter medium to thereby dislodge said contaminants which have collected on said filtration side of said filter medium; and said counter-flow generator and thereby said localized stream of counter-flow fluid being movably mounted for movement of said counter flow stream relative to and over a substantial portion of said filter medium.

10. A filter according to claim 9 further comprising a clearing-flow generator comprising at least one fluid outlet located on said filtration side that directs a localized stream of clearing-flow fluid, with a velocity having a component which is parallel to the surface of said filter medium, onto said filter medium; and a drive motor for moving said clearing-flow generator and thereby said localized stream of counter-flow fluid, relative to and over a substantial portion of said filter medium.

11. A filter according to claim 10 wherein said localized stream of clearing-flow fluid is directed onto an area adjacent to the area on said filter medium through which said localised stream of counter-flow fluid flows.

12. A filter according to claim 11 wherein said localized stream of counter-flow fluid and said localized stream of clearing-flow fluid move substantially in unison for at least a portion of their said movement.

13. A filter comprising:
a filter medium substantially cylindrical in shape, for filtering contaminants from a process fluid, having a filtration side on which said contaminants collect and a filtrate side from which filtrate flows;

a counter-flow generator comprising at least one fluid outlet located on said filtrate side that directs a localized stream of counter-flow fluid from said filtrate side to said filtration side of said filter medium to thereby dislodge said contaminants which have collected on said filtration side of said filter medium;

a drive motor for moving said counter-flow generator and thereby said localized stream of counter-flow fluid, relative to and over a substantial portion of said filter medium;

a clearing-flow generator comprising at least one fluid outlet located on said filtration side that directs a localized stream of clearing-flow fluid, with a velocity having a component which is parallel to the surface of said filter medium, onto said filter medium; and a drive motor for moving said clearing-flow generator and thereby said localized stream of clearing-flow fluid, relative to and over a substantial portion of said filter medium.

14. A filter according to claim 13 wherein said localized stream of clearing-flow fluid is directed onto an area adjacent to the area on said filter medium through which said localized stream of counter-flow fluid flows.

15. A filter according to claim 14 wherein said localized stream of counter-flow fluid and said localized stream of clearing-flow fluid move substantially in unison for at least a portion of their said movement.

16. A filter comprising:
a filter medium substantially cylindrical in shape, for filtering contaminants from a process fluid, having a filtration side on which said contaminants collect and a filtrate side from which filtrate flows;

a counter-flow generator comprising at least one fluid outlet located on said filtrate side that directs a localized stream of counter-flow fluid from said filtrate side to said filtration side of said filter medium to thereby dislodge said contaminants which have collected on said filtration side of said filter medium; and a drive motor for moving said counter-flow generator and thereby said localized stream of counter-flow fluid, relative to and over a substantial portion of said filter medium;

wherein said filter medium is divided into a grid of elements the centers of which bow towards the direction of flow of said filtrate upon sufficient pressure differential across said filter medium and, when exposed to said localised counter-flow, invert to bow in the direction of said counter-flow fluid to thereby assist in the dislodgment of said contaminants from said filter medium.

17. A filter according to claim 16 further comprising a clearing-flow generator comprising at least one fluid outlet located on said filtration side that directs a localized stream of clearing-flow fluid, with a velocity having a component which is parallel to the surface of said filter medium, onto said filter medium; and     a drive motor for moving said clearing-flow generator and thereby said localized stream of clearing-flow fluid, relative to and over a substantial portion of said filter medium.

18. A filter according to claim 17 wherein said localized stream of clearing-flow fluid is directed onto an area adjacent to the area on said filter medium through which said localised stream of counter-flow fluid flows.

19. A filter according to claim 18 wherein said localized stream of counter-flow fluid and said localised stream of clearing-flow fluid move substantially in unison for at least a portion of their said movement.

20. A filter comprising:

a filter medium substantially cylindrical in shape, for filtering contaminants from a process fluid, having a filtration side on which said contaminants collect and a filtrate side from which filtrate flows;

a counter-flow generator comprising at least one fluid outlet located on said filtrate side that directs a localized stream of counter-flow fluid from said filtrate side to said filtration side of said filter medium to thereby dislodge said contaminants which have collected on said filtration side of said filter medium;

means for moving said counter-flow generator and thereby said localized stream of counter-flow fluid, relative to and over a substantial portion of said filter medium;

a clearing-flow generator comprising at least one fluid outlet located on said filtration side that directs a localized stream of clearing-flow fluid, with a velocity having a component which is parallel to the surface of said filter medium, onto said filter medium; and     means for moving said clearing-flow generator and thereby said localized stream of clearing-flow fluid, relative to and over a substantial portion of said filter medium.

21. A filter according to claim 20 wherein said localized stream of clearing-flow fluid is directed onto an area adjacent to the area on said filter medium through which said localized stream of counter-flow fluid flows.

22. A filter according to claim 21 wherein said localized stream of counter-flow fluid and said localized stream of clearing-flow fluid move substantially in unison for at least a portion of their said movement.

23. A filter according to claim 22 wherein said counter-flow generator further comprises a manifold with a plurality of fluid outlets, said manifold being rotatable about an axis within said substantially cylindrical filter medium to traverse said filter medium.

24. A filter according to claim 23 wherein said clearing-flow generator further comprises a manifold with a plurality of fluid outlets, said manifold being rotatable about an axis within said substantially cylindrical filter medium to traverse said filter medium.

25. A filter according to claims 22, 23 or 24 wherein said substantially cylindrical filter medium is substantially immersed in a vessel containing said process fluid.

26. A filter comprising:

a filter medium substantially cylindrical in shape, for filtering contaminants from a process fluid, having a filtration side on which said contaminants collect and a filtrate side from which filtrate flows;

a counter-flow generator comprising at least one fluid outlet located on said filtrate side that directs a localized stream of counter-flow fluid from said filtrate side to said filtration side of said filter medium to thereby dislodge said contaminants which have collected on said filtration side of said filter medium; and     means for moving said counter-flow generator and thereby said localized stream of counter-flow fluid, relative to and over a substantial portion of said filter medium;

wherein said filter medium is divided into a grid of elements the centers of which bow towards the direction of flow of said filtrate upon sufficient pressure differential across said filter medium and, when exposed to said localized counter-flow, invert to bow in the direction of said counter-flow fluid to thereby assist in the dislodgment of said contaminants from said filter medium.

27. A filter according to claim 26 wherein said counter-flow generator further comprises a manifold with a plurality of fluid outlets, said manifold being rotatable about an axis within said substantially cylindrical filter medium to traverse said filter medium.

28. A filter according to claim 27 further comprising a clearing-flow generator comprising at least one fluid outlet located on said filtration side that directs a localized stream of clearing-flow fluid, with a velocity having a component which is parallel to the surface of said filter medium, onto said filter medium; and     a means for moving said clearing-flow generator and thereby said localized stream of clearing-flow fluid, relative to and over a substantial portion of said filter medium.

29. A filter according to claim 28 wherein said localized stream of clearing-flow fluid is directed onto an area adjacent to the area on said filter medium through which said localized stream of counter-flow fluid flows.

30. A filter according to claim 29 wherein said localized stream of counter-flow fluid and said localized stream of clearing-flow fluid move substantially in unison for at least a portion of their said movement.

31. A filter according to claim 30 wherein said clearing-flow generator further comprises a manifold with a plurality of fluid outlets, said manifold being rotatable about an axis within said substantially cylindrical filter medium to traverse said filter medium.

32. A filter according to claims 26, 27, 28, 29, 30 or 31 wherein said substantially cylindrical filter medium is substantially immersed in a vessel containing said process fluid.

\* \* \* \* \*

UNITED STATES PATENT AND TRADEMARK OFFICE
CERTIFICATE OF CORRECTION

PATENT NO.     : 6,354,442 B1
DATED          : March 12, 2002
INVENTOR(S)    : Yuri Obst It is certified that error appears in the above-identified patent and that said Letters Patent is hereby corrected as shown below:

<u>Title page,</u>
Item [30], Foreign Application Priority Data, change "December 1 1997" to
-- November 29, 1996 --

Signed and Sealed this

Twentieth Day of May, 2003

JAMES E. ROGAN
*Director of the United States Patent and Trademark Office*